T. L. ELMORE.
VEHICLE WHEEL.
APPLICATION FILED DEC. 11, 1915.
1,178,997.
Patented Apr. 11, 1916.
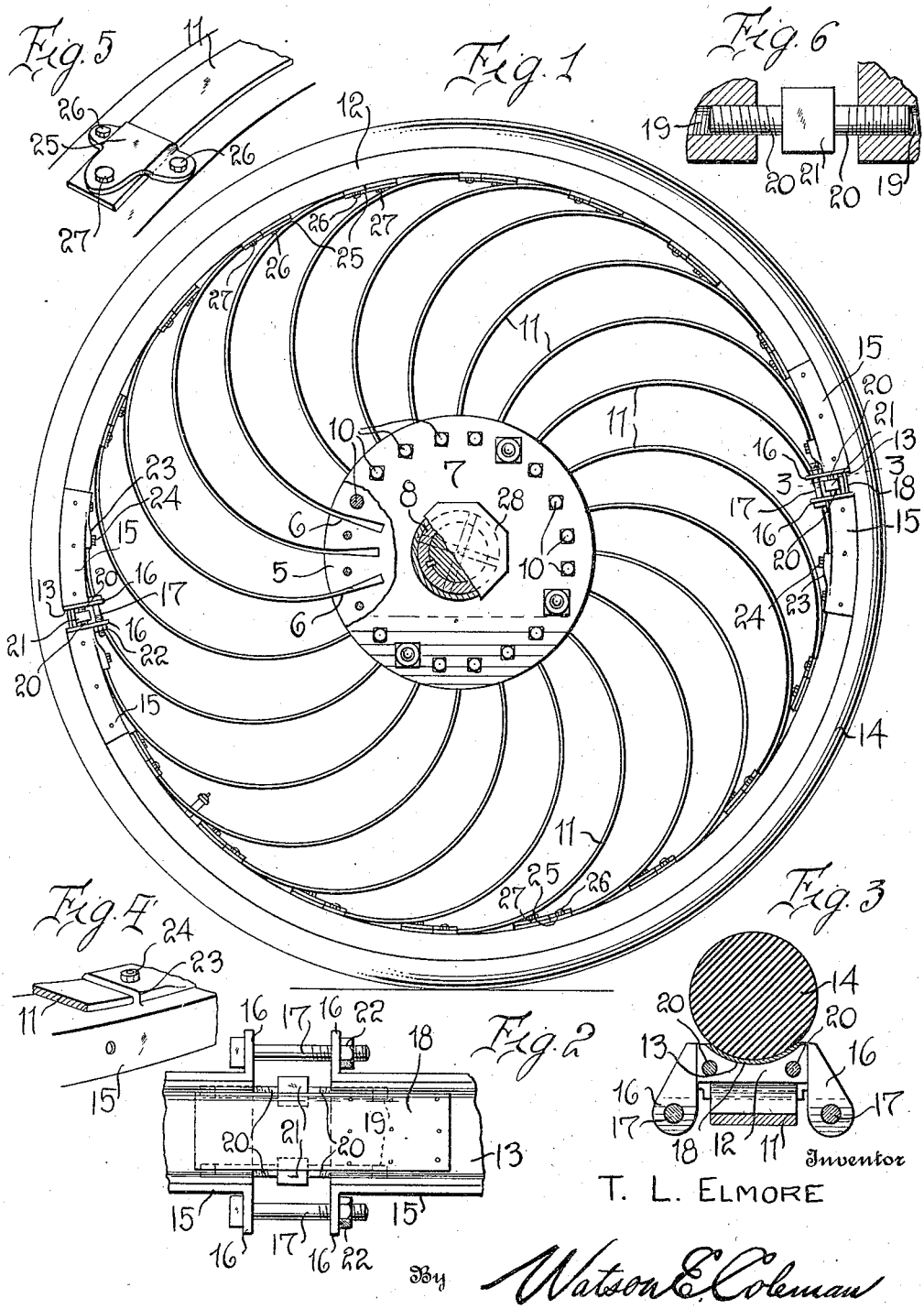
Inventor
T. L. ELMORE
By Watson E. Coleman
Attorney

UNITED STATES PATENT OFFICE.

THOMAS L. ELMORE, OF BAKER, FLORIDA, ASSIGNOR OF ONE-HALF TO ANDREW J. BAGGETT, OF BIRMINGHAM, ALABAMA.

VEHICLE-WHEEL.

1,178,997.　　　　　Specification of Letters Patent.　　Patented Apr. 11, 1916.

Application filed December 11, 1915. Serial No. 66,357.

*To all whom it may concern:*

Be it known that I, THOMAS L. ELMORE, a citizen of the United States, residing at Baker, in the county of Okaloosa and State of Florida, have invented certain new and useful Improvements in Vehicle-Wheels, of which the following is a specification, reference being had to the accompanying drawings.

This invention relates to improvements in vehicle wheels and has for its primary object to provide a spring wheel for automobiles and other vehicles whereby all shocks or jars are absorbed in the wheel structure and not transmitted to the body of the vehicle.

The invention has for another important object to provide an improved wheel rim constructed in two sections, and means for expanding said sections to hold the same in tight clamping engagement against the wheel tire.

It is another and more particular object of the invention to provide a spring wheel having a plurality of resilient metal spokes fixed at one of their ends to the wheel hub, and an improved bracket for connecting the outer ends of the respective spokes to the wheel rim, whereby a maximum flexibility of action in the spokes is permitted.

The invention has for a further general object to improve and simplify the construction of wheels of the above type and render the same strong and durable in practical use and capable of manufacture at relatively small cost.

With the above and other objects in view, my invention consists in the novel features of construction, combination and arrangement of parts to be hereinafter more fully described, claimed and illustrated in the accompanying drawing, in which, Figure 1 is a side elevation, partly broken away and partly in section, of a spring wheel constructed in accordance with the present invention; Fig. 2 is an enlarged fragmentary plan view, the tire being removed from the wheel; Fig. 3 is a section taken on the line 3—3 of Fig. 1; Fig. 4 is a detail fragmentary perspective view showing the manner of connecting the spokes to the castings on the ends of the rim sections; Fig. 5 is a similar view showing the bracket for connecting the remaining spokes to the rim sections; and Fig. 6 is an enlarged detail sectional view of the expanding bolt engaged in the abutting ends of the rim sections.

Referring in detail to the drawing, 5 designates the hub of the wheel which is provided with a plurality of spaced spoke receiving recesses or sockets 6, said sockets gradually tapering from their inner ends to the periphery of the hub. Upon the opposite sides of the hub body, face plates 7 are arranged, said plates being provided with sleeves or hubs 8 to receive the wheel axle 9 extending through the hub. These face plates are keyed or otherwise rigidly fixed to the axle. Fastening bolts, indicated at 10, extend through the face plates and the wheel hub between the spoke receiving recesses or sockets in the latter.

The wheel spokes 11 are each formed of a length of resilient steel of requisite thickness, in accordance with the load capacity of the vehicle to which the wheel is to be applied. The inner ends of these spokes gradually increase in thickness and tightly fit in the respective sockets 6 in the wheel hub. The rim of the wheel consists of two sections 12, the outer faces of which are circumferentially grooved or concave as at 13, to receive the wheel tire 14. This tire may be of solid rubber construction or of the pneumatic type, as preferred.

Upon the opposite end of each of the rim sections 12, a channel-shaped metal casting 15 is bolted or otherwise rigidly fixed. Upon the outer end of this casting and at each side thereof, the laterally projecting ears 16 are formed, said ears being apertured to receive bolts 17 which connect the castings on the opposed ends of the rim sections. In the concave or grooved outer face of one rim section at the end thereof, a curved sheet metal plate 18 is countersunk and securely fixed, the curvature of said plate conforming to that of the channel or groove in the rim. This plate bridges the space between the opposed ends of the rim sections and provides a continuous seating surface for the tire 14.

The rim sections, which are constructed of steel or other metal, are provided in their ends with spaced threaded bores 19, the corresponding bores in the opposed ends of the rim sections being oppositely threaded to receive the right and left hand threaded portions of an expanding bolt 20. This bolt is centrally formed with a polygonal-shaped enlargement 21 for the application of a suitable wrench thereto. It will be understood that, by turning the bolts 20 in the proper direction, the rim sections may be forced apart and into clamping engagement against the inner face of the tire 14 which has been arranged upon the rim. The nuts 22 on the ends of the bolts 17 are then tightened against the ears 16 carried by one rim section so that the rim sections are positively connected and held against relative movement. Each of the castings 15 is provided in its outer end and upon its medial portion which is disposed upon the inner face of the wheel rim, with a socket indicated at 23, to receive the outer end of one of the curved spokes 11. A bolt 24 is disposed through an opening in the wall of said socket and a coinciding opening in the spoke and threaded into the rim of the wheel. The other spokes 11 are connected to the rim sections by means of a bracket 25 shown in detail in Fig. 5 of the drawing. This bracket has a relatively wide end portion provided with openings in its opposite ends to receive the screws or bolts 26 which are adapted to be threaded into the rim. The outer end of the wheel spoke 11 extends longitudinally upon the wheel rim between the bracket plate and the face of the rim, and the terminal of the spoke is fixed to the rim by a bolt 27 extending through an opening therein and a coinciding opening in a relatively narrow end portion of the bracket plate, said bolt being threaded into the wheel rim. Thus the spoke is securely held against any transverse or pivotal movement with respect to the rim.

As shown in Fig. 1, transverse key pins are disposed through the hub 8 on the face plate 7 and the wheel axle, and a cap or nut indicated at 28 has threaded engagement upon the hub 8 over the ends of said pins. It is of course apparent that when the ordinary pneumatic tire is employed instead of the solid tire as shown, the wheel rim will have an opening therein to accommodate the stem of the inflating valve connected to the inner tube of the tire.

From the foregoing description, taken in connection with the accompanying drawing, the construction and several advantages of my invention will be clearly and fully understood. The spring wheel is extremely strong and durable and capable of withstanding very severe usage and will entirely absorb all shocks or jars so that the same will not be transmitted to the body of the vehicle and occasion the passengers discomfort. By manipulating the expanding bolts 20, the rim sections of the wheel may be easily, quickly and tightly clamped against the wheel tire or released from such clamping engagement so that the tire may be removed.

While I have disclosed a certain number of the steel spokes in the accompanying drawing, it will, of course, be apparent that any desired number of spokes can be employed in the wheel structure. The device is also susceptible of a great many other modifications therein and I, therefore, reserve the privilege of adopting all such legitimate changes as may be fairly embodied within the spirit and scope of the invention as claimed.

Having thus fully described my invention, what I desire to claim and secure by Letters Patent is:

A vehicle wheel including a sectional rim, channel-shaped castings fixed to the opposite ends of the rim sections, each of said castings being provided upon one of its ends and on opposite sides thereof with outwardly projecting ears extending inwardly from the wheel rim, each of said castings having a spoke receiving socket formed upon its intermediate wall, and bolts connecting the corresponding ears on said castings and connecting the rim sections to each other.

In testimony whereof I hereunto affix my signature in the presence of two witnesses.

THOMAS L. ELMORE.

Witnesses:
J. W. BOGGETT, Jr.,
E. J. COBB.

Copies of this patent may be obtained for five cents each, by addressing the "Commissioner of Patents, Washington, D. C."